May 8, 1934. N. BOUVENG 1,957,426
MINIATURE CAMERA SPOOL AND WINDING MECHANISM
Filed March 24, 1931
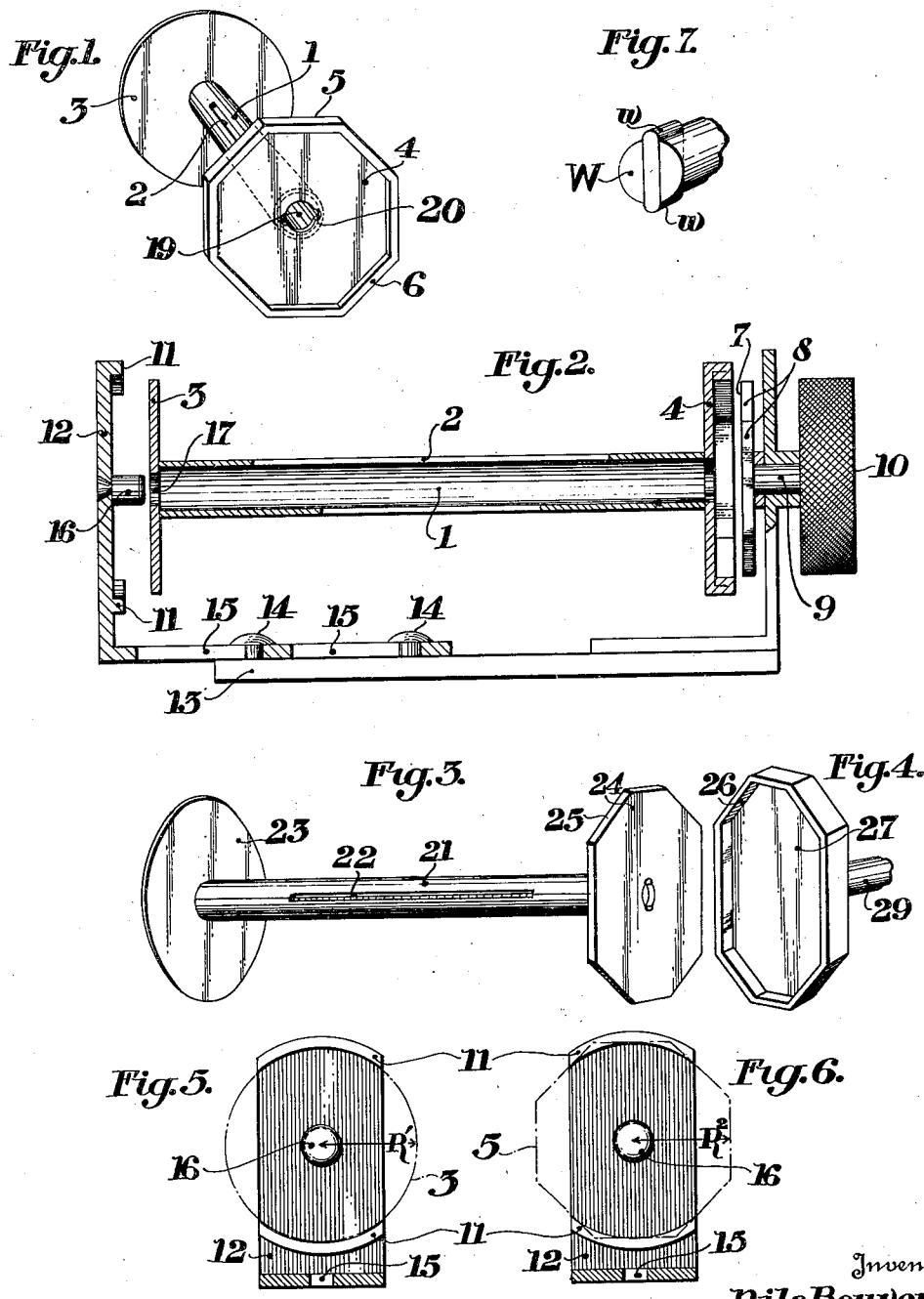

Patented May 8, 1934

1,957,426

UNITED STATES PATENT OFFICE 1,957,426

MINIATURE CAMERA SPOOL AND WINDING MECHANISM

Nils Bouveng, Elga, Satsjabaden, Sweden, assignor to Eastman Kodak Company, Rochester, N. Y., a corporation of New York Application March 24, 1931, Serial No. 524,835

9 Claims. (Cl. 242—71)

This invention relates to photography and more particularly to camera spools and winding devices for photographic apparatus such as cameras. One object of my invention is to provide a film spool which can readily be made of light weight material and which has a relatively large area of driving contact with a film winding device. Another object of my invention is to provide a film spool in which a periphery of a film spool flange receives driving contact through a winding key which engages an outer edge of the flange. Another object of my invention is to provide cooperating parts on a spool flange and spool winding mechanism which have a substantial driving contact and yet which may be made compact to go in thin cameras. Still another object of my invention is to provide co-operating engaging parts on a spool and winding mechanism which can be readily brought into driving contact and other objects will appear from the following specification, the novel features being particularly pointed out in the claims at the end thereof.

The present trend of camera construction is to continually reduce the size of a camera designed for a standard size film. In order to do this the film spools are reduced in size and weight, particularly as to the size of the hubs of the spools. Consequently the usual type of spool engaging web on a winding key is unsuitable because of its small size tending to tear away a key slot of normal size in the spool flange, which may be made of very thin metal. The size of the key slot, of course, is determined by the diameter of the film spool hub, since the spool flanges and hub must have a light tight joint.

In order to overcome the difficulties due to insufficient contact between a winding mechanism and a film spool flange, I have provided a relatively small light weight spool flange with a relatively large cooperating part which is engaged by a part of the film winding mechanism.

Coming now to the drawing wherein like reference characters denote like parts of my invention:

Fig. 1 is a perspective view of a spool constructed in accordance with and embodying a preferred form of my invention;

Fig. 2 is a section through a spool supporting mechanism and spool both designed in accordance with a preferred embodiment of my invention;

Fig. 3 illustrates a second embodiment of my invention in the form of a spool shown in perspective;

Fig. 4 is a perspective view of a winding device constructed to cooperate with the spool shown in Fig. 3;

Fig. 5 is an end elevation of the spool supporting device shown in Fig. 2;

Fig. 6 is a view similar to Fig. 5 but illustrating the relation of the non-round film spool flange to the spool support shown in Fig. 5; and Fig. 7 is a web type winding key adapted to be used with the spool illustrated in Figs. 1 and 3, if desired.

As a preferred embodiment of my invention I show in Fig. 1 on a largely magnified scale a film spool which may consist of a hub member 1 which is in the form of a hollow metal tube having a slot 2 for holding the end of the film backing paper. To one end of the hub I attach a flange which is preferably circular in form and to the other end of the hub there is attached a flange 4 of non-round contour.

While I do not in any way limit my invention to metal of any definite thicknesses, I can, in accordance with the embodiments herein described, make a perfectly successful spool with the hub of .008" to .010" metal, and flanges of .010" to .015". The thinner the metal used, the more advantageous my improved construction. Of course, for ultra compact cameras the spools and winding mechanism must both be as small and light as possible.

As shown in Fig. 1, flange 4 may consist of a plurality of tangentially or angularly arranged edges 5 here shown as being eight in number, the edges of these angular portions being formed outwardly at substantially right angles to the plane of flange 4 into ribs 6. These ribs form a hollow box shaped structure and the ribs 6 are for both strengthening the spool flange 4 and forming a relatively large surface which may be engaged by a suitable spool winding member.

Such a member may consist of a plate 7 having a plurality of angularly arranged edges 8 corresponding in number and shape to the ribs 6, the plate 7 being attached to a shaft 9 which may be turned by a key 10. The plate 7 is preferably of such a thickness that it fits snugly into the hollow box shaft member formed by the flange 4 and the outwardly extending ribs 6. Thus the cooperating parts of the winding key and the film spool engage at the edges or periphery of the flange 4 and there are large contacting surfaces which furnish an ample area for driving the spool through the winding key 10.

Not only does the plate 7 form a driving contact with the periphery of flange 4 for turning the spool but it also positions one end of the spool without the use of a centering pin such as is customary.

The other end of the spool, that is, the end supporting the round flange 3 may be supported solely by the arcuate flanges 11 extending outwardly from a plate 12. This plate is mounted on base 13 upon studs 14 passing upwardly through slots 15. While the arcuate supporting members 11 are all that is necessary where the thickness of the camera permits, I prefer to also provide a central stud 16 of such size as to freely enter a circular opening 17 in flange 3. This forms an additional support for one end of the spool.

As indicated in Fig. 2 member 12 may be slid upon the studs 14 bringing the spool supporting members into engagement with the flange end 3 and moving the spool to the right of Fig. 2, thus engaging the plate 8 in the box shaped opening in the flange 4.

A second embodiment of my invention is shown in Figs. 3 and 4 wherein the spool core 21 is provided with a flange 23 of circular shape and a flange 24 of non-round shape, this flange being adapted to fit into a complementary shaped winding device consisting of a hollow box-like receptacle 27 mounted to turn upon a shaft 29. The flanges 26 of the box-like receptacle 27 are of a depth no greater than the thickness of the metal from which flange 24 is made. Thus the winding device does not interfere with backing paper and film being passed to or from the spool, since a flange 26 cannot overlie the flange 24 and extend into the space between the spool flanges 23 and 24.

It is useful to provide a means for insuring the proper positioning of the spool in the winding device accordingly. As shown in Figs. 5 and 6 the round flange 3 is of such a diameter that it will fit snugly in the arcuate flanges 11 and as above explained may be totally supported thereby. The radius of the round flange 3 indicated at R' in Fig. 5 is preferably the same or less than the distance R2 between the center of the spool hub and one of the tangentially arranged edges 5 of the non-round film spool. This being the case, as illustrated in Fig. 6, the non-round side of the spool cannot be inadvertently placed in the spool holding device carried by plate 12.

It is, of course, the desire of spool manufacturers to have their spool suitable for all cameras which are on the market. Consequently I prefer to provide the usual type of web opening 19 in the spool flange 4, this being a substantially circular opening with a pair of offsets or slots 20. Such a key end on a film spool is well known and is adapted to be engaged by the usual type of winding key shown in Fig. 7 which consists of a shaft W having a web w for engaging portions 20 of the key slot.

As can readily be seen with a small size film there is considerable danger of such a winding key bending the metal and thus failing to turn a small light weight film spool if the backing paper or film should bind as it sometimes does. I, therefore, prefer not to engage the film spool for turning at the center thereof but to provide a driving contact between the periphery of the spool and a special key since this gives such a large frictional engagement that there is practically no chance of having the spool damaged. Such a key does not tend to distort the spool flange. Moreover, with a small winding key and a small aperture for receiving it in the film spool it is quite difficult to bring the parts into engagement particularly when the film support structure is located in a camera or on a roll holder with co-operating parts of the winding key and spool made as large as possible. It is a much simpler matter to position the spool in operative engagement with the film winding device where the inter-engaging parts are of large size. This is also true of the supporting structure for the opposite end of the film spool.

While, of course, my improved film spool and winding device therefore are adapted for use on cameras and spools of any size they are particularly suitable for the so-called miniature camera in which the parts are very small and are made of light metal. It might also be noted that since the spool may be supported on each end by flat plates with only the peripheries of the spool flanges supported by and contacting with the camera mechanism, a camera can be made only a small fraction of an inch thicker than the spool length. To position a spool it is only necessary to move the spool supports a few thousandths of an inch where the central spool trunnion 16 is omitted, instead of one quarter or three-eighths of an inch as is customary with known type of cameras.

Having thus described my invention, what I claim as new and desire to secure by Letters Patent is:

1. A spool for photographic apparatus comprising a hub member, a pair of dissimilar flanges on the hub member, one flange being circular in shape and the other flange being in the form of a polygon, the edges of which have a rib extending outwardly therefrom.

2. A spool for photographic apparatus comprising a hub member, a pair of dissimilar flanges on the hub member, one flange being circular in shape and the other flange being in the form of a polygon, the edges of which have ribs projecting at substantially right angles therefrom.

3. A spool for photographic apparatus comprising a hub member, a pair of dissimilar flanges on the hub member, one flange being circular in shape and the other flange being in the form of a polygon, the edges of said polygon projecting to one side of said flange forming therewith a hollow box like receptacle.

4. A spool for photographic apparatus comprising a hub member, a pair of dissimilar flanges on the hub member, one flange being circular in shape and the other flange being in the form of a polygon, the edges of which are spaced from the spool center a distance at least as great as the radius of the circular flange.

5. A spool for photographic apparatus comprising a hub member, a pair af dissimilar flanges on the hub member, one flange being circular in shape and the other flange being in the form of a polygon, the sides of the polygon joining at a plurality of points each spaced from the spool center a distance greater than the radius of the circular flange.

6. A spool for photographic apparatus comprising a hub member, a pair of dissimilar flanges on the hub member, one flange being circular in shape and the other flange being in the form of a regular polygon said hub and flanges consisting of light weight sheet metal stock, and means included in the periphery of the polygonal flange adapted to engage a complementary shaped winding device.

7. A spool for photographic apparatus comprising a hub member, a pair of dissimilar flanges on the hub member, one flange being circular in shape and the other flange in the form of a polygon having a series of annularly disposed edges lying in the plane of the flange, a reinforcing rib extending around the edges of the polygon adapted to cooperate with a suitable shaped winding device.

8. In a compact film winding device for photographic cameras, the combination with a spool including a hub member and a pair of flanges carried by the hub member, one thicker than the other, the thicker flange having a shallow recess including straight-sided walls sunk into the face thereof, said recess extending at least across the major part of the face of the flange, of a film winding element comprising a substantially flat plate having straight sided edges adapted to engage the walls of the recess whereby driving connection is obtained through said edges and walls and whereby there is a large surface contact between said film winding element and said film spool flange.

9. A film spool for photographic apparatus comprising a hub member, a pair of flanges mounted on the hub member, one flange being thicker than the other, the thicker of the two flanges including a shallow recess, straight sided walls formed by edges of the recess, said recess extending across the major portion of the face of the flange and including a material part of the total area of said flange whereby a large contact area and a large driving contact may be provided on the thicker film spool flange through the recess and its straight sided walls therein for a flat straight sided winding element adapted to contact with and fit therein.

NILS BOUVENG.